United States Patent
Latta et al.

(10) Patent No.: US 9,256,282 B2
(45) Date of Patent: Feb. 9, 2016

(54) VIRTUAL OBJECT MANIPULATION

(75) Inventors: Stephen G. Latta, Seattle, WA (US); Kevin Geisner, Seattle, WA (US); Relja Markovic, Seattle, WA (US); Darren Alexander Bennett, Seattle, WA (US); Arthur Charles Tomlin, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 464 days.

(21) Appl. No.: 12/408,589

(22) Filed: Mar. 20, 2009

(65) Prior Publication Data

US 2010/0241998 A1 Sep. 23, 2010

(51) Int. Cl.
*G06F 3/01* (2006.01)

(52) U.S. Cl.
CPC ............... *G06F 3/011* (2013.01); *G06F 3/017* (2013.01)

(58) Field of Classification Search
CPC ........................................................ G06F 3/048
USPC .......... 715/856; 345/419, 167, 164, 163, 161, 345/157, 156; 341/20; 10/856
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |

(Continued)

FOREIGN PATENT DOCUMENTS

| | | |
|---|---|---|
| CN | 1815409 A | 8/2006 |
| CN | 201254344 B | 6/2010 |

(Continued)

OTHER PUBLICATIONS

PCT Application No. PCT/US2010/025932 : International Search Report and Written Opinion of the International Searching Authority, Oct. 19, 2010, 13 pages.

(Continued)

*Primary Examiner* — Doon Chow
*Assistant Examiner* — David Choi
(74) *Attorney, Agent, or Firm* — Gregg Wisdom; Judy Yee; Micky Minhas

(57) ABSTRACT

Systems, methods and computer readable media are disclosed for manipulating virtual objects. A user may utilize a controller, such as his hand, in physical space to associate with a cursor in a virtual environment. As the user manipulates the controller in physical space, this is captured by a depth camera. The image data from the depth camera is parsed to determine how the controller is manipulated, and a corresponding manipulation of the cursor is performed in virtual space. Where the cursor interacts with a virtual object in the virtual space, that virtual object is manipulated by the cursor.

15 Claims, 8 Drawing Sheets

(56) References Cited

U.S. PATENT DOCUMENTS

| | | | |
|---|---|---|---|
| 4,939,672 A * | 7/1990 | Meadows | 715/856 |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,319,747 A * | 6/1994 | Gerrissen et al. | 715/839 |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,483,261 A | 1/1996 | Yasutake | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,588,098 A | 12/1996 | Chen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,664,128 A * | 9/1997 | Bauer | 715/708 |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,874,956 A * | 2/1999 | LaHood | 715/854 |
| 5,875,108 A | 2/1999 | Hoffberg et al. | |
| 5,877,803 A | 3/1999 | Wee et al. | |
| 5,886,700 A * | 3/1999 | Di Pippo et al. | 715/769 |
| 5,913,727 A | 6/1999 | Ahdoot | |
| 5,933,125 A | 8/1999 | Fernie | |
| 5,956,038 A | 9/1999 | Rekimoto | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,014,142 A * | 1/2000 | LaHood | 715/848 |
| 6,054,991 A | 4/2000 | Crane et al. | |
| 6,057,909 A | 5/2000 | Yahav et al. | |
| 6,061,696 A * | 5/2000 | Lee et al. | 715/209 |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,078,308 A * | 6/2000 | Rosenberg et al. | 715/856 |
| 6,098,458 A | 8/2000 | French et al. | |
| 6,100,517 A | 8/2000 | Yahav et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,191,773 B1 | 2/2001 | Maruno et al. | |
| 6,215,890 B1 | 4/2001 | Matsuo et al. | |
| 6,215,898 B1 | 4/2001 | Woodfill et al. | |
| 6,219,032 B1 * | 4/2001 | Rosenberg et al. | 345/157 |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,317,116 B1 * | 11/2001 | Rosenberg et al. | 715/701 |
| 6,337,703 B1 | 1/2002 | Konar et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,421,047 B1 | 7/2002 | Groot | |
| 6,430,997 B1 | 8/2002 | French et al. | |
| 6,476,834 B1 | 11/2002 | Doval et al. | |
| 6,496,598 B1 | 12/2002 | Harman | |
| 6,498,628 B2 | 12/2002 | Iwamura | |
| 6,502,515 B2 | 1/2003 | Burckhardt et al. | |
| 6,503,195 B1 | 1/2003 | Keller et al. | |
| 6,512,838 B1 | 1/2003 | Rafii et al. | |
| 6,529,210 B1 | 3/2003 | Rees | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,771,277 B2 | 8/2004 | Ohba | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,006,236 B2 | 2/2006 | Tomasi et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,043,695 B2 * | 5/2006 | Elber et al. | 715/771 |
| 7,050,177 B2 | 5/2006 | Tomasi et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,131,073 B2 * | 10/2006 | Rosenberg et al. | 715/856 |
| 7,139,685 B2 | 11/2006 | Bascle et al. | |
| 7,151,530 B2 | 12/2006 | Roeber et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,224,384 B1 | 5/2007 | Iddan et al. | |
| 7,227,526 B2 | 6/2007 | Hildreth et al. | |
| 7,259,747 B2 | 8/2007 | Bell | |
| 7,293,356 B2 | 11/2007 | Sohn et al. | |
| 7,294,815 B2 | 11/2007 | Haven | |
| 7,308,112 B2 | 12/2007 | Fujimura et al. | |
| 7,310,431 B2 | 12/2007 | Gokturk et al. | |
| 7,317,836 B2 | 1/2008 | Fujimura et al. | |
| 7,340,077 B2 | 3/2008 | Gokturk et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |

(56) References Cited

U.S. PATENT DOCUMENTS

| | | | |
|---|---|---|---|
| 7,389,591 B2 | 6/2008 | Jaiswal et al. | |
| 7,397,464 B1* | 7/2008 | Robbins et al. | 345/173 |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,465,230 B2 | 12/2008 | Lemay et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,843,470 B2* | 11/2010 | Bannai et al. | 345/633 |
| 7,852,262 B2 | 12/2010 | Namineni et al. | |
| 7,889,195 B2* | 2/2011 | Shih et al. | 345/419 |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,055,061 B2* | 11/2011 | Katano | 382/154 |
| 8,072,470 B2 | 12/2011 | Marks | |
| 8,350,897 B2* | 1/2013 | Endo et al. | 348/53 |
| 2002/0033845 A1* | 3/2002 | Elber et al. | 345/764 |
| 2002/0109668 A1* | 8/2002 | Rosenberg et al. | 345/156 |
| 2003/0048280 A1 | 3/2003 | Russell | |
| 2003/0085866 A1 | 5/2003 | Bimber et al. | |
| 2003/0128208 A1* | 7/2003 | Shih et al. | 345/419 |
| 2004/0207597 A1 | 10/2004 | Marks | |
| 2005/0005247 A1 | 1/2005 | Kamachi et al. | |
| 2005/0059488 A1 | 3/2005 | Larsen et al. | |
| 2006/0170652 A1* | 8/2006 | Bannai et al. | 345/156 |
| 2006/0188144 A1 | 8/2006 | Sasaki et al. | |
| 2006/0192852 A1* | 8/2006 | Rosenthal et al. | 348/61 |
| 2006/0205463 A1 | 9/2006 | Imaeda et al. | |
| 2006/0239558 A1 | 10/2006 | Rafii et al. | |
| 2006/0282461 A1 | 12/2006 | O'Connor et al. | |
| 2007/0013718 A1 | 1/2007 | Ohba | |
| 2007/0021207 A1 | 1/2007 | Ahdoot | |
| 2007/0060336 A1 | 3/2007 | Marks et al. | |
| 2007/0083290 A1 | 4/2007 | Henderson et al. | |
| 2007/0091084 A1 | 4/2007 | Ueshima et al. | |
| 2007/0098222 A1 | 5/2007 | Porter et al. | |
| 2007/0171194 A1 | 7/2007 | Conti et al. | |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0026838 A1 | 1/2008 | Dunstan et al. | |
| 2008/0030499 A1 | 2/2008 | Wanda et al. | |
| 2008/0062257 A1 | 3/2008 | Corson | |
| 2008/0082991 A1 | 4/2008 | Fairs et al. | |
| 2008/0088620 A1* | 4/2008 | Shih et al. | 345/420 |
| 2008/0100620 A1 | 5/2008 | Nagai et al. | |
| 2008/0126937 A1 | 5/2008 | Pachet | |
| 2008/0134102 A1 | 6/2008 | Movold et al. | |
| 2008/0152191 A1 | 6/2008 | Fujimura et al. | |
| 2008/0215972 A1 | 9/2008 | Zalewski et al. | |
| 2008/0215973 A1 | 9/2008 | Zalewski et al. | |
| 2008/0280660 A1* | 11/2008 | Ueshima et al. | 463/3 |
| 2009/0027337 A1* | 1/2009 | Hildreth | 345/158 |
| 2009/0046893 A1* | 2/2009 | French et al. | 382/103 |
| 2009/0051758 A1* | 2/2009 | Endo et al. | 348/53 |
| 2009/0141933 A1 | 6/2009 | Wagg | |
| 2009/0143141 A1* | 6/2009 | Wells et al. | 463/37 |
| 2009/0167679 A1 | 7/2009 | Klier et al. | |
| 2009/0221368 A1 | 9/2009 | Yen et al. | |
| 2010/0198653 A1* | 8/2010 | Bromenshenkel et al. | 705/10 |
| 2010/0241998 A1* | 9/2010 | Latta et al. | 715/862 |

FOREIGN PATENT DOCUMENTS

| | | |
|---|---|---|
| EP | 0583061 A2 | 2/1994 |
| JP | 08044490 A1 | 2/1996 |
| JP | 11-237867 A | 8/1999 |
| JP | 2006-209664 A | 8/2006 |
| RU | 54233 U1 | 6/2006 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |
| WO | WO 2010/107577 A2 | 9/2010 |

OTHER PUBLICATIONS

Qian et al., "A Gesture-Driven Multimodal Interactive Dance System", IEEE International Conference on Multimedia and Expo, Taipei, Jun. 2004, 3, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Billinghurst, M., et al., 'Shared space: Collaborative information spaces', Presented at *HCI International 97*, http://www.hitl.washington.edu/publications/p-96-5/, Downloaded from the Internet on Dec. 10, 2008, 3 pages.

Buxton, W.,et al., 'HMDs, caves & chameleon: A human-centric analysis of interaction in virtual space', *SIGGRAPH Computer Graphics Newsletter—Interaction in 3D Graphics*, Downloaded from Internet on Dec. 10, 2008, http://www.billbuxton.com/VRtaxonomy.html, vol. 32, No. 4 (Nov. 1998), 12 pages.

Strauss, W., et al., 'Electronic multi-user stage environment', *EMUSE*, http://netzspannung.org/cat/servlet/CatServlet?cmd=document&subCommand=show&forward=%2fnetzkollektor%2foutput%2fproject.xml&entryId=149793&section=content&lang=en, Downloaded from Internet on Dec. 10, 2008, 2 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

(56) References Cited

OTHER PUBLICATIONS

Shao et al., "An Open System Architecture for a Multimedia and Multimodal User Interface", Aug. 24, 1998, Japanese Society for Rehabilitation of Persons with Disabilities (JSRPD), Japan.
Kohler, "Special Topics of Gesture Recognition Applied in Intelligent Home Environments", In Proceedings of the Gesture Workshop, 1998, pp. 285-296, Germany.
Kohler, "Vision Based Remote Control in Intelligent Home Environments", University of Erlangen-Nuremberg/ Germany, 1996, pp. 147-154, Germany.
Kohler, "Technical Details and Ergonomical Aspects of Gesture Recognition applied in Intelligent Home Environments", 1997, Germany.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International Conference on Multimedia and Expo (ICME), Taipei, Taiwan.
Zhao, "Dressed Human Modeling, Detection, and Parts Localization", 2001, The Robotics Institute, Carnegie Mellon University, Pittsburgh, PA.
He, "Generation of Human Body Models", Apr. 2005, University of Auckland, New Zealand.
Isard et al., "CONDENSATION—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collusion of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
Japan Application No. 2012-500821; Notice of Rejection; dated Jan. 22, 2014; 6 pages.
Russian Application No. 2011138417/08; Office Action; dated Jun. 24, 2014; 8 pages.
"European Search Report Received For European Patent Application 10753858.9", Mailed date: Jun. 15, 2015, 7 Pages.

* cited by examiner

VIRTUAL OBJECT MANIPULATION

BACKGROUND OF THE INVENTION

Many computing applications, such as computer games, present to a user virtual environments or worlds. These environments often contain virtual objects that the user may interact with. Typical, such interaction occurs through input devices such as controllers, remotes, keyboards, mice, or the like. Unfortunately, such methods of input do not correlate well with the action being performed, such as pressing a button on a controller to open a door.

SUMMARY OF THE INVENTION

It would therefore be an improvement to enable the user to interact with virtual objects in a virtual environment using a mapping between a physical object that the user controls, such as his hand, that corresponds to a cursor in the virtual environment. Disclosed herein are methods, systems and computer readable media that perform such virtual object manipulation.

In an exemplary embodiment, a physical controller of the user is associated with a cursor in the virtual environment. User controller input is received, and from that, corresponding cursor manipulation is determined. Where the cursor manipulation corresponds to the manipulation of a virtual object, that manipulation on the virtual object is performed, and the result is displayed on a display device.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for virtual object manipulation in accordance with this specification are further described with reference to the accompanying drawings in which.

DETAILED DESCRIPTION OF ILLUSTRATIVE EMBODIMENTS

As will be described herein, a user may control an application executing on a computing environment such as a game console, a computer, or the like by performing one or more gestures. According to one embodiment, the gestures may be received by, for example, a capture device. For example, the capture device may capture a depth image of a scene. In one embodiment, the capture device may determine whether one or more targets or objects in the scene corresponds to a human target such as the user. To determine whether a target or object in the scene corresponds a human target, each of the targets may be flood filled and compared to a pattern of a human body model. Each target or object that matches the human body model may then be scanned to generate a skeletal model associated therewith. The skeletal model may then be provided to the computing environment such that the computing environment may track the skeletal model, render an avatar associated with the skeletal model, and may determine which controls to perform in an application executing on the computer environment based on, for example, gestures of the user that have been recognized from the skeletal model. A gesture recognizer engine, the architecture of which is described more fully below, is used to determine when a particular gesture has been made by the user.

Figure 1A:
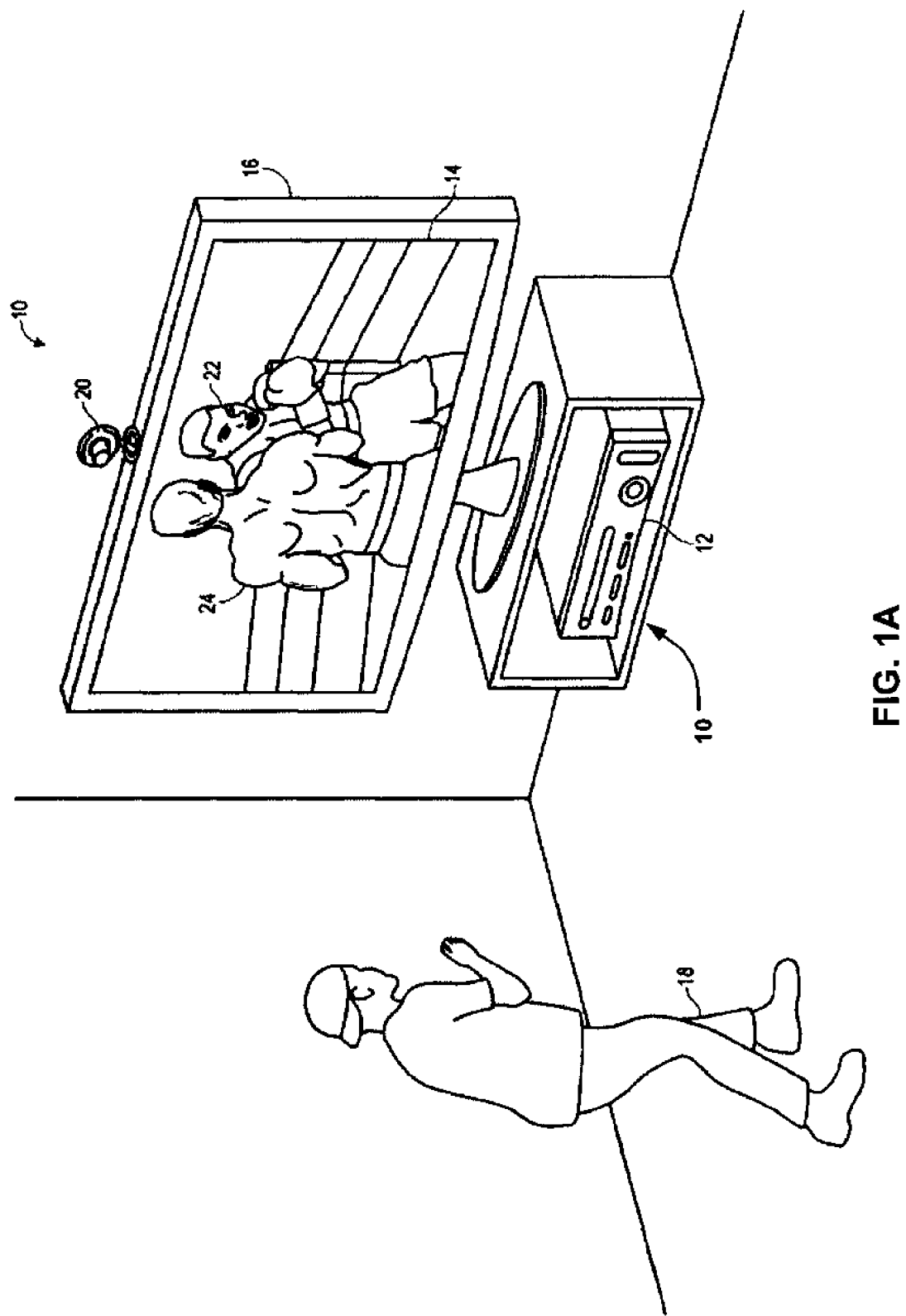
FIGS. 1A and 1B illustrate an example embodiment of a target recognition, analysis, and tracking system with a user playing a game.
Figure 1B:
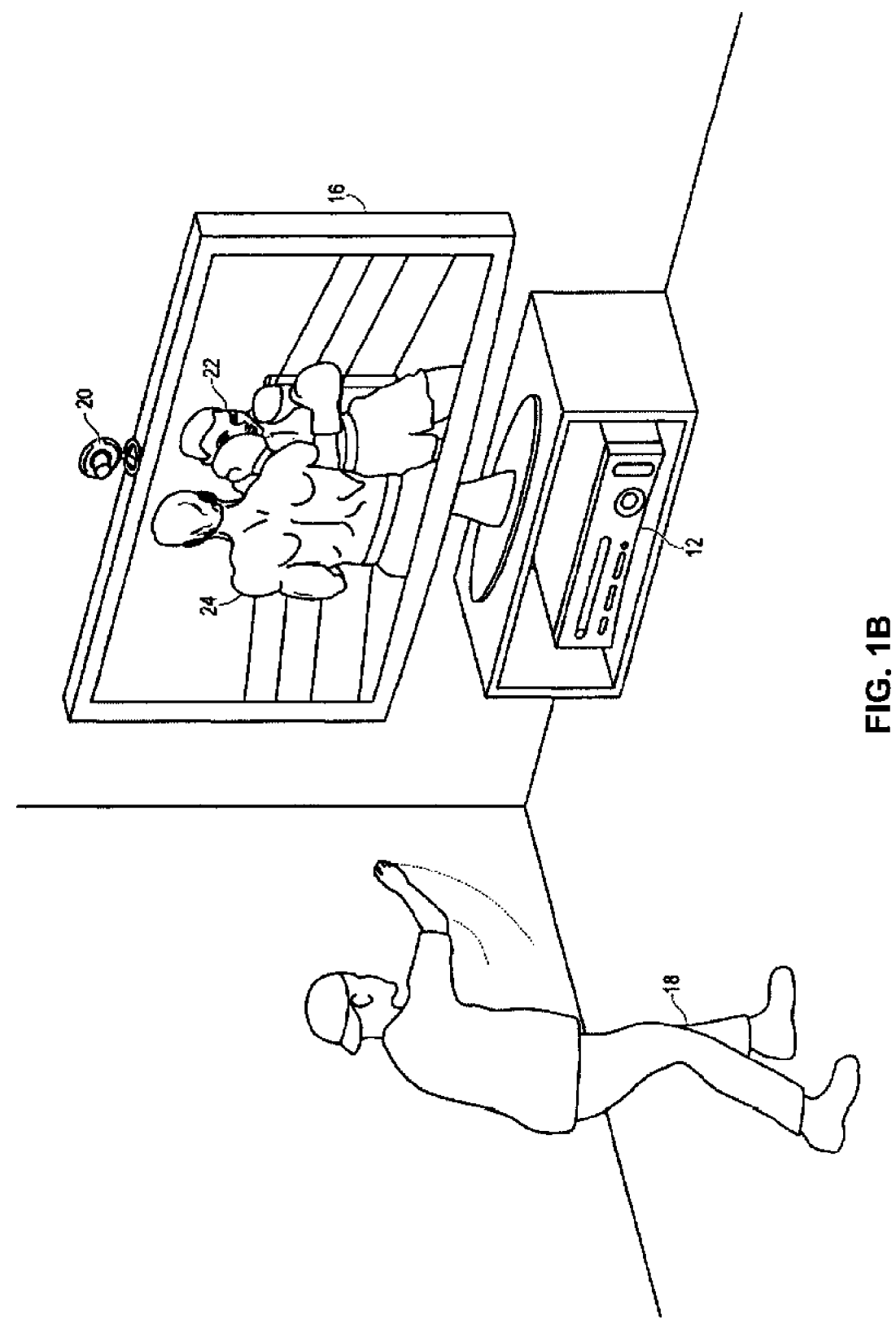

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 24 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 24. For example, the player may use movements to end, pause, or save a game, select a level, view high scores, communicate with a friend, etc.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
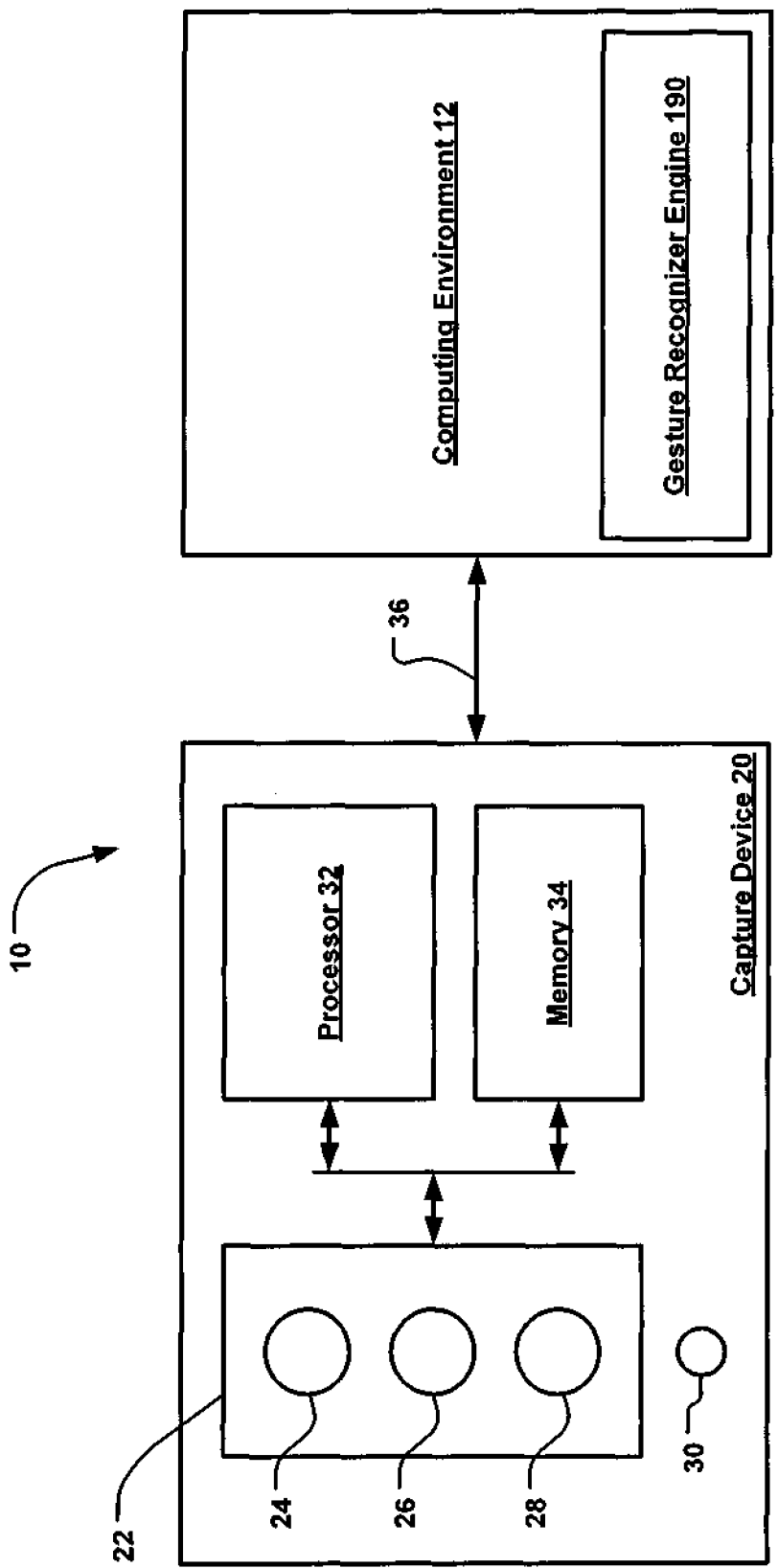
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30. The microphone 30 may include a transducer or sensor that may receive and convert sound into an electrical signal. According to one embodiment, an array of microphones 30 may be used to reduce feedback or audio distortion as compared to a single microphone that receives sound. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, recognize user gestures and in response control an application such as a game or word processor. For example, as shown, in FIG. 2, the computing environment 12 may include a gestures recognizer engine 190. The gestures recognizer engine 190 may include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognizer engine 190 to identify when a user (as represented by the skeletal model) has performed one or more gestures. Those gestures may be associated with various controls of an application. Thus, the computing environment 12 may use the gesture recognizer engine 190 to interpret movements of the skeletal model and to control an application based on the movements.

Figure 3A:
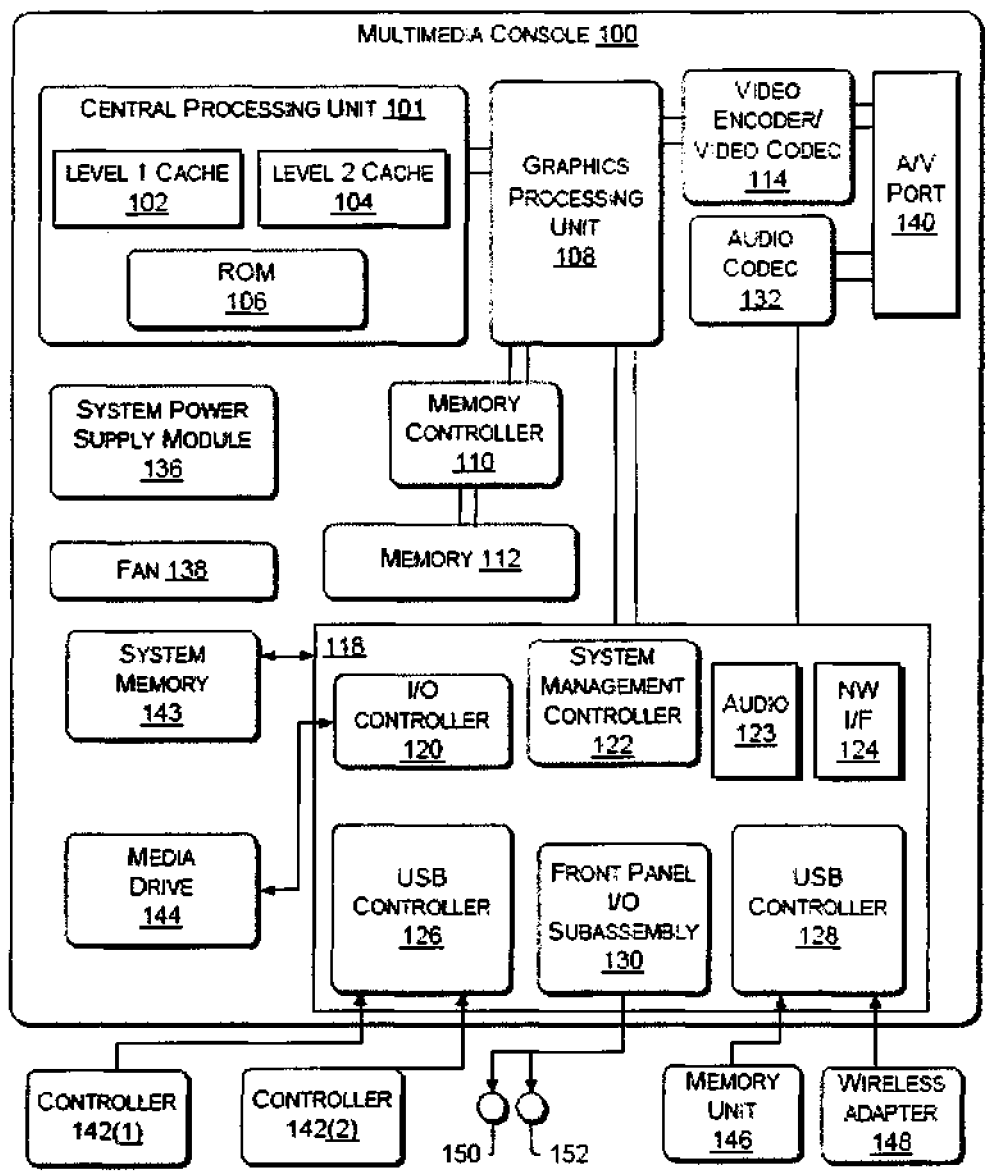
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 3B:
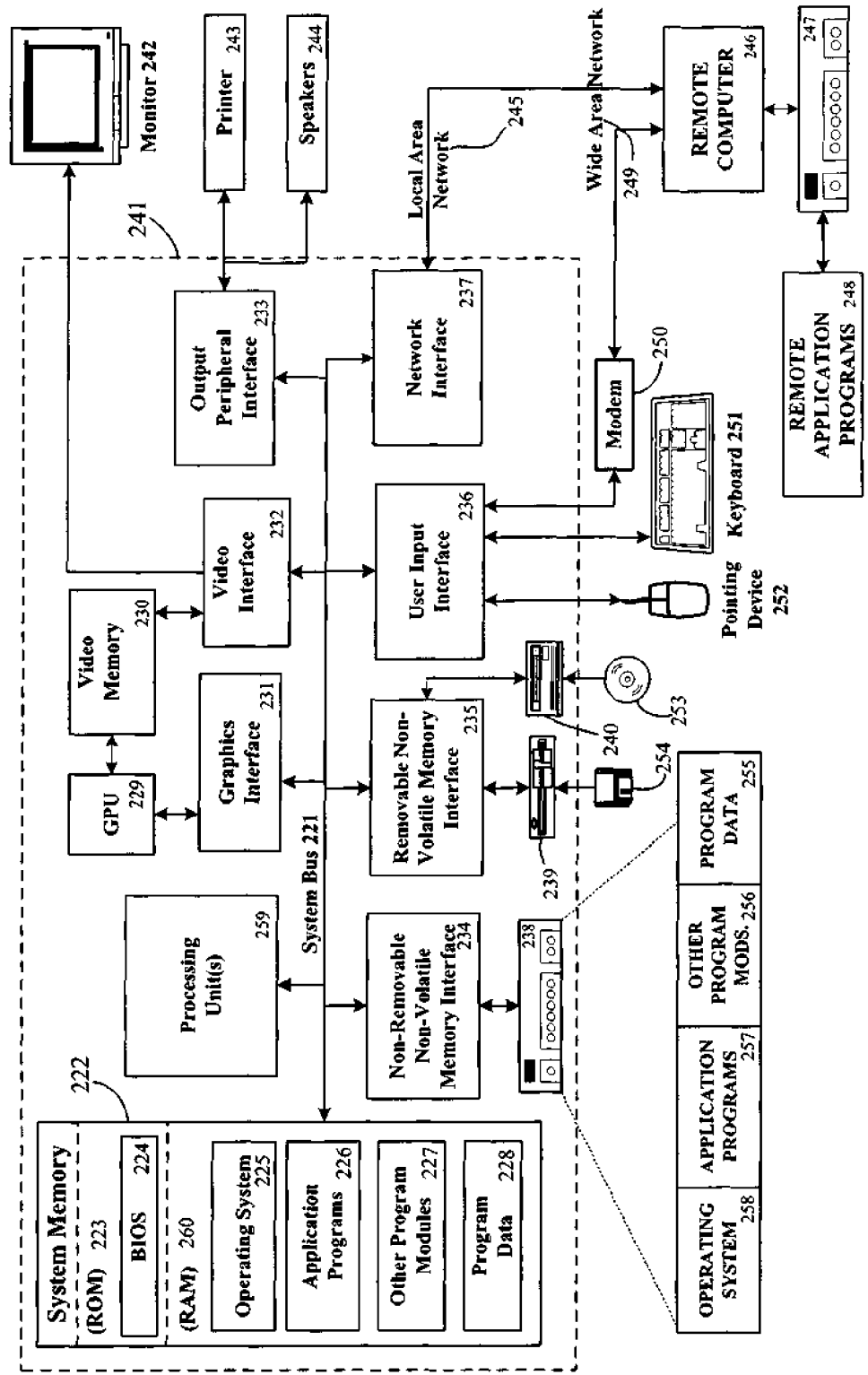
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more gestures in a target recognition, analysis, and tracking system.

The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4A:
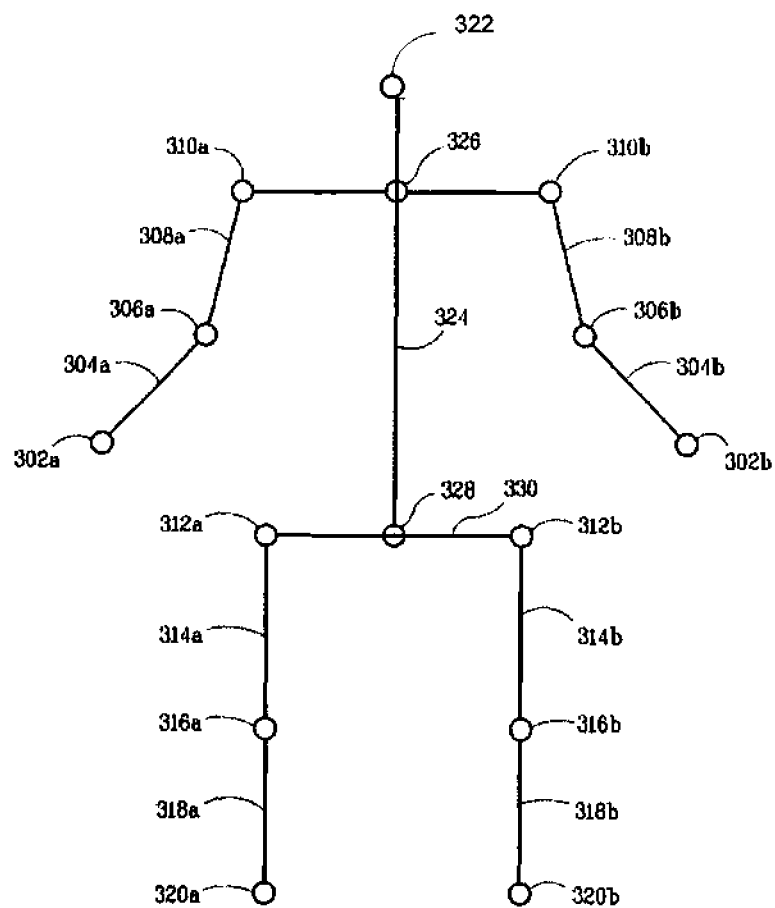
FIG. 4A illustrates a skeletal mapping of a user that has been generated from the target recognition, analysis, and tracking system of FIG. 2.

FIG. 4A depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and bottom 328 of the spine, and the waist 330. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 304 in front of his torso 324. A gesture may also incorporate props, such as by swinging a mock sword. A gesture may comprise more than one body part, such as clapping the hands 302 together, or a subtler motion, such as pursing one's lips.

Gestures may be used for input in a general computing context. For instance, various motions of the hands 302 or other body parts may correspond to common system wide tasks such as navigate up or down in a hierarchical list, open a file, close a file, and save a file. Gestures may also be used in a video-game-specific context, depending on the game. For instance, with a driving game, various motions of the hands 302 and feet 320 may correspond to steering a vehicle in a direction, shifting gears, accelerating, and breaking.

A user may generate a gesture that corresponds to walking or running, by walking or running in place himself. The user may alternately lift and drop each leg 312-320 to mimic walking without moving. The system may parse this gesture by analyzing each hip 312 and each thigh 314. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for application-determined parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 320 leave the ground entirely. The system may parse the skeleton for this gesture by analyzing the angle relation of the shoulders 310, hips 312 and knees 316 to see if they are in a position of alignment equal to standing up straight. Then these points and upper 326 and lower 328 spine points may be monitored for any upward acceleration. A sufficient combination of acceleration may trigger a jump gesture.

Given this "heel lift jump" gesture, an application may set values for application-determined parameters associated with this gesture. The parameters may include the above acceleration threshold, which determines how fast some combination of the user's shoulders 310, hips 312 and knees 316 must move upward to trigger the gesture, as well as a maximum angle of alignment between the shoulders 310, hips 312 and knees 316 at which a jump may still be triggered.

The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience. Where a gesture recognizer system is too sensitive, and even a slight forward motion of the hand 302 is interpreted as a throw, the user may become frustrated because gestures are being recognized where he has no intent to make a gesture, and thus, he lacks control over the system. Where a gesture recognizer system is not sensitive enough, the system may not recognize conscious attempts by the user to make a throwing gesture, frustrating him in a similar manner. At either end of the sensitivity spectrum, the user becomes frustrated because he cannot properly provide input to the system.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 302-310 to full length while making the grab gesture. In this situation, a similar grab gesture where the user only partially extends his arm 302-310 may not achieve the result of interacting with the ball.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 310a, and on the same side of the head 322 as the throwing arm 302a-310a. It may not be necessary to define all bounds of a volume, such as with this throwing gesture, where an outer bound away from the body is left undefined, and the volume extends out indefinitely, or to the edge of scene that is being monitored.

Figure 5:
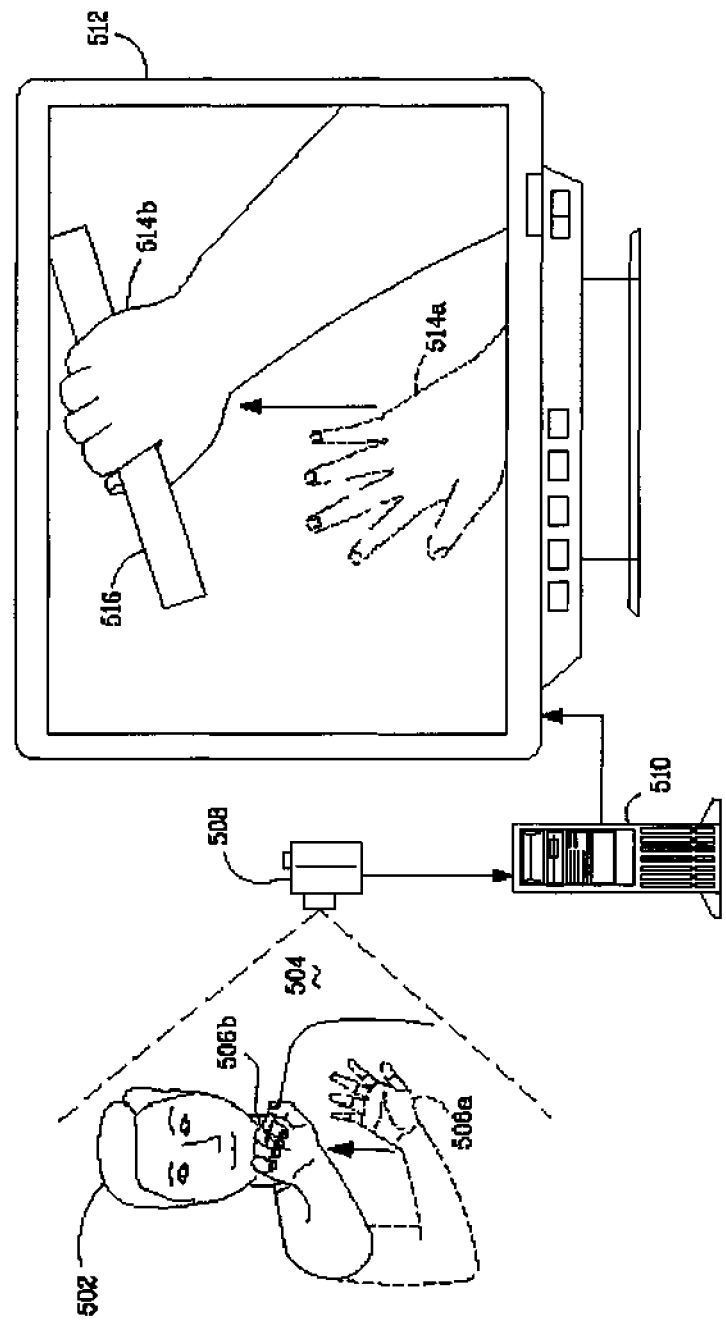
FIG. 5 illustrates a system that captures user controller manipulation and maps it to cursor manipulation of a virtual object.

FIG. 5 illustrates a system that captures user controller manipulation in a physical space and maps it to cursor manipulation of a virtual object in a virtual environment.

A virtual space may comprise a representation of a three-dimensional space that a user may affect—say by moving an object—through user input. That virtual space may be a completely virtual space that has no correlation to a physical space of the user—such as a representation of a castle or a classroom not found in physical reality. That virtual space may also be based on a physical space that the user has no relation to, such as a physical classroom in Des Moines, Iowa that the user in Redmond, Wash. has never seen or been inside.

The virtual space may comprise a representation of some part of the user's physical space. A depth camera that is capturing the user may also capture the environment that the user is physically in, parse it to determine the boundaries of the space visible by the camera as well as discrete objects in that space, and create virtual representations of all or part of that, which are then presented to the user as a virtual space.

The virtual space may comprise a representation of some part of a second user's physical space. Where two users are interacting with each other through a virtual environment and by being captured by respective depth cameras, that virtual space may be a representation of that second user's virtual space.

The virtual space may also be some combination of these spaces. It may be a concatenation of a representation of the user's physical space and a purely virtual space (which may be called a purely virtual sub-space, since the concatenation is a virtual space), such that both are represented as a single virtual space. Likewise, it may be a concatenation of a representation of the user's physical space, a purely virtual space and a representation of the second user's virtual space, a concatenation of a representation of the user's physical space and a representation of the second user's physical space, or a concatenation of a representation of the second user's physical space and a purely virtual space.

In an embodiment, the user views this virtual space from a first-person perspective or a third-person perspective. In a first person perspective, the virtual space is displayed to the user as if the user were in the space—the display shows what the user would see with his own eyes. In a third-person perspective, the virtual space is displayed to the user with a representation of that user, such as an avatar, in that virtual space, similar to as if the user were being observed in that space by a third person.

In an embodiment, a virtual object comprises an object in the virtual space that may be interacted with. Where the virtual space is purely virtual and represents a classroom, things such as chalk, erasers, blackboards, chairs, desks, globes, windows, doorknobs and doors may be virtual objects. The user may manipulate or interact with these objects in a variety of ways, such as by writing with, lifting, moving, throwing, or breaking in half a piece of chalk.

In an embodiment, the virtual object corresponds to a physical object. This may be a physical object in the possession of the user. For instance, if the user has a chair, that physical chair may be captured by a depth camera and a representation of the chair may be inserted into the virtual environment. Where the user moves the physical chair, the depth camera may capture this, and display a corresponding movement of the virtual chair.

In an embodiment where the virtual object corresponds to a physical object, there may be situations where one is moved independently of the other. Given the physical chair and virtual chair above, where the user moves the virtual chair, it may be that the corresponding physical chair does not move. For instance, the user may throw a virtual ball at the virtual chair and the resulting collision will knock over the virtual chair. However, since no physical force was imparted on the physical chair, it will remain upright. Likewise, the physical object may be moved without moving its corresponding virtual object. For instance, where the user is in a large room, but the virtual space is comparatively smaller, the user may move the physical chair far to his right. If the virtual chair is already touching a virtual wall in the corresponding direction, it may not move though the physical chair did move.

In an embodiment, the virtual object corresponds to a physical object of a second user. Where it is a physical chair of the second user that is virtualized, the user will be presented with only a virtual representation of that second user's chair. As the user interacts with that virtual chair, those interactions (such as moving it) may be reflected in the virtual environment. This may not be reflected in actual movement of the physical chair. In an embodiment, this interaction is displayed to the second user as well, such that the virtual environment displayed to both the user and the second user remains consistent. In an embodiment, this interaction is not displayed to the second user, such that the second user's virtual environment and the second user's physical environment remain consistent.

In an embodiment, where a virtual object corresponds to a physical object of a second user, the user cannot manipulate this virtual object. That ensures that the virtual environment displayed to both users and the second user's physical environment remain consistent. In an embodiment, the second user may manipulate the virtual object by manipulating the corresponding physical object. As the second user has physical access to the physical object, his manipulation of the physical object may be reflected in both users' virtual environments, so those virtual environments and the second user's physical environment would remain consistent.

A controller comprises something that the user manipulates in physical space to cause a cursor in virtual space to be manipulated in a corresponding fashion. A controller may comprise a physical thing. It may be a body part, such as the user's hand. It likewise may be a physical object, such as a baton or pointer, a disc, or a ball. Where the controller is a body part, a depth camera may be used to provide depth data that is then parsed to determine skeletal data of the user. From this skeletal data and how this skeletal data changes over time, the user's movements of his controller may be determined.

A controller may comprise an imaginary thing. The user may motion to throw an imaginary ball. This may be detected using user skeletal data as above. For instance, the user may motion to throw an imaginary ball towards the display device that is displaying a virtual object. Where that ball would intersect the display may be calculated and then the way in which this would affect the virtual object—such as through a collision—may be determined and displayed. In an embodiment, when the imaginary ball intersects the display, it may be shown as a virtual object in virtual space and proceed on its flight in that virtual space.

A cursor may comprise a virtual representation of the controller in virtual space that may interact with a virtual object in virtual space. By manipulating one or more controllers in physical space, a user is able to cause the manipulation of one or more corresponding cursors in virtual space, and where those cursors cause a virtual object in virtual space to be manipulated (such as a virtual block being pushed), that manipulation occurs. Further, a cursor may be invisible in that it is not displayed on the display device.

A capture device 508 captures a scene 504 in a physical space in which a user 502 is present. The capture device is coupled to a computing device 510 that outputs to a display 512. In an embodiment, capture device 508 comprises capture device 20 of FIG. 2, and computing device 510 comprises computing environment 12 of FIG. 2, multimedia console 100 of FIG. 3A or computing environment 220 of FIG. 3B.

The capture device captures this scene and produces depth data. From this depth data, a user controller 506 is determined and monitored for how the user 502 manipulates it. The computing device 510 associates the user controller 506 with a cursor 514 (cursors 514a and 514b depict the cursor at two points in time as it corresponds to controller 506a and 506b at two points in time) in a virtual environment displayed on the display 512.

The controller 506 may be predetermined—the system may always find the user's 502 right hand to be the controller 506, and thus always associate the user's 502 right hand with the cursor. The controller may also be user-determined. For instance, the computing device 510 may display to the user 502 the image data captured by the capture device 508 with an indication to place the controller in a specific area of the screen. If the user 502 places his left hand in that area, that may be determined to be the controller. The same would apply if the user 502 places his right hand, a foot, or some object such as a baseball bat in that area.

The controller 506 is then used to manipulate an on-screen cursor 514. The cursor 514 may be a representation of the controller 506. The cursor 514 may be a right hand where the controller 506 is the user's right hand. Likewise, the cursor 514 may be the user's left hand where the controller 506 is the user's left hand. In an embodiment, the cursor 514 and the controller 506 are not directly related in this manner. For instance, the controller 506 may be the user's hand, but the cursor 514 may be a representation of a tennis racket or a stevedore claw. Multiple controllers 506 and multiple cursors 514 may be used within a single virtual environment. For instance each hand of a user 502 may comprise a controller 506, or two users (present in either the same physical environment, or separate physical environments, each having a computing device that communicate together across a communications network) may each have a controller 506, like their right hand, and each of these controllers 506 may map to a cursor 514.

As the user manipulates the controller 506, this manipulation is captured by the capture device 508 and processed by the computing device 510 to impart a corresponding manipulation on the cursor 514. For instance, where the user extends his controller 506a hand and closes his fingers 506b, the virtual hand cursor 514a may extend into the virtual scene and the fingers of that virtual hand may close 514b.

The computing device 510 may keep track of position data for the cursor 514 and at least some virtual object in the scene (like depicted virtual baton 516), such that it can determine when a cursor 514 is touching the virtual object 516 as a result of user manipulation of the controller 506. Where this manipulation of the cursor 514 via the controller 506 causes the virtual object 516 to be manipulated, the computing device 510 may determine the manipulation that has occurred and display the result of this manipulation on the display device. For instance, where the user extends his hand cursor 514 and closes his fingers into a fist, this may cause the hand cursor 514 to extend into the scene, and the fingers of the cursor 514 to clasp around the virtual baton 516 Where the user continues to extend his controller 506 forward, and this causes his cursor 514 to continue to extend into the scene, it may be determined that the virtual baton 516 is being manipulated by being moved into the scene, and this result may be displayed on the display 512.

Figure 6:
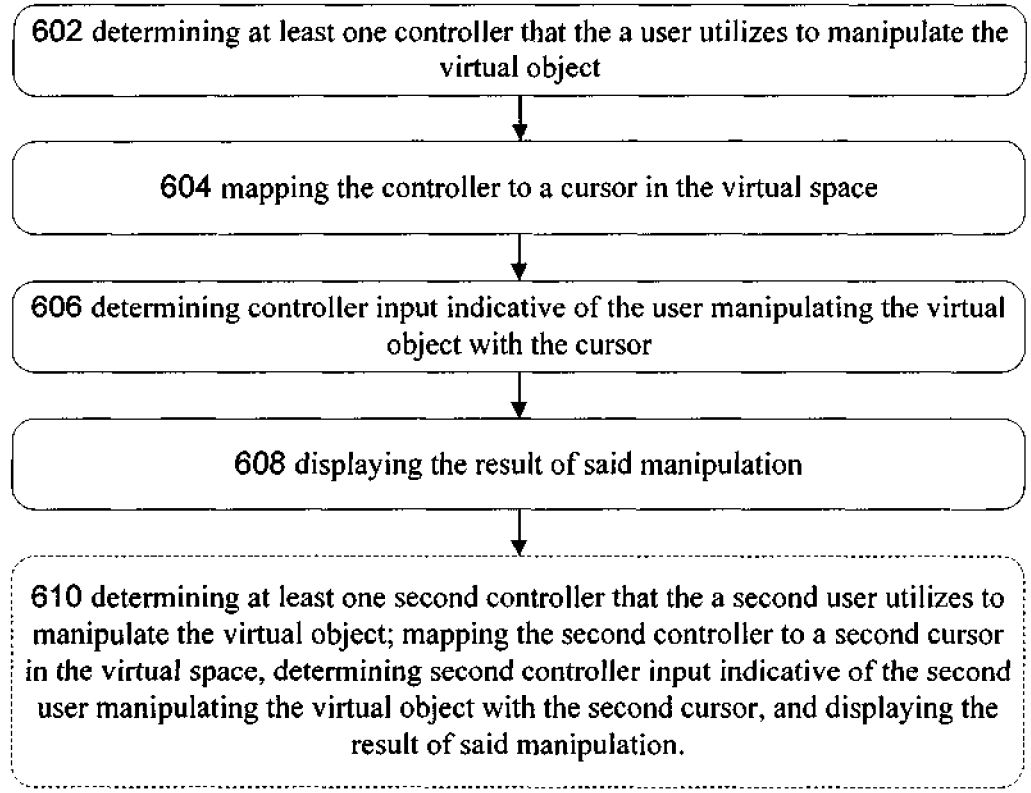
FIG. 6 illustrates exemplary operational procedures for virtual object manipulation.

FIG. 6 depicts example operational procedures for manipulating a virtual object in a virtual space.

Operation 602 depicts determining at least one controller that the a user utilizes to manipulate the virtual object.

Operation 604 depicts mapping the controller to a cursor in the virtual space. The mapping may be an association such that a movement of the controller in a scene that is observed by the depth camera and parsed for controller movement corresponds to movement of the cursor.

Operation 606 depicts determining controller input indicative of the user manipulating the virtual object with the cursor.

In an embodiment, there is a scale of movement, and determining that controller input indicative of the user manipulating the virtual object with the cursor includes determining that controller input indicative of the user manipulating the virtual object with the cursor in proportion to the scale of movement. Where the scale of movement is 1:2, this may mean that for every inch the user moves the controller, the cursor is to be moved two inches in the same direction. This may be two inches as defined by the virtual world (e.g. the virtual world may be presented smaller than the corresponding physical world to begin with, such that a six-foot tall person appears as a three-foot tall avatar when displayed on the display device) or a literal two inches, such that this corresponds to a movement of two inches on the display screen.

In an embodiment, the cursor has at least one dimension, and determining that controller input indicative of the user manipulating the virtual object with the cursor in proportion to the scale of movement, includes determining that controller input indicative of the user manipulating the virtual object with the cursor in proportion to the dimension. Take the example where the controller is the user's hand, and the cursor is a virtual hand attached to a forearm. The cursor may stretch or extend in response to controller manipulation. For instance, if the user extends his hand toward the depth camera, along the dimension of the z-axis, rather than solely moving forward along the z-axis dimension, the hand and forearm may stretch forward along that dimension.

In an embodiment, a physics model is used to determine how the cursor interacts with the virtual object. For instance, in a given physics model, a virtual object may have a mass and the virtual environment may have a gravity, so rolling a stationary virtual ball will require imparting sufficient force on it with the cursor to overcome the ball's inertia. The physics model may accurately model the physical world on Earth, or some other model may be used. For instance, the gravity in the physics model may be weaker than Earth gravity so that an object bounces higher under otherwise equal circumstances after being dropped to the ground by use of the cursor. This physics model may extend beyond how a cursor interacts with a virtual object to how a virtual object interacts with a second virtual object. For instance, where the user uses the controller to cause the cursor to push a first virtual ball into a second virtual ball, the second virtual ball may begin to roll as a result of that collision between the two virtual balls.

There may be a virtual collision in virtual space without a corresponding physical collision in physical space. The user can move the controller through physical space in such a manner that it would require the corresponding cursor in virtual space to move through a virtual object or part of the virtual environment that is unmovable, such as a wall, or an extremely heavy boulder, as according to the physics model above. In an embodiment, the cursor is being animated to show movement in the virtual environment, and when such a collision occurs, the cursor stops animating and remains still at the point of collision, until the user uses the controller to manipulate the cursor in a direction that does not involve a collision. In an embodiment, the animation of the cursor continues through the collision so that there will be no disconnect between the user's position of the controller in the physical environment and the position of the cursor in the virtual environment.

Operation 608 depicts displaying the result of said manipulation.

In an embodiment, the result of said manipulation comprises associating the virtual object with a physical object such that a change in the physical object is reflected as a corresponding change of the virtual object. For example, two people in separate physical environments may be interacting in a virtual environment that is a concatenation of a representation of their respective physical environments. The first user may select a virtual shirt and associate it with the second user's physical shirt, and as a result of this association, the second user is shown in the virtual environment to be wearing this virtual shirt rather than the physical shirt. This wearing of the virtual shirt may be shown only to the first user, only to the second user, or to both users.

Optional operation 610 depicts determining at least one second controller that the a second user utilizes to manipulate the virtual object; mapping the second controller to a second cursor in the virtual space, determining second controller input indicative of the second user manipulating the virtual object with the second cursor, and displaying the result of said manipulation.

Where multiple users are interacting in the same virtual environment, the manipulations of a virtual object by a second user may be displayed to the first user on his display device. In an embodiment, two users may manipulate a single virtual object simultaneously. In an embodiment, the virtual object has a plurality of dimensions and the first user manipulates a first dimension of the plurality of dimensions and the second user manipulates a second dimension of the plurality of dimensions. For instance, the first user may lift an object, and the second user may rotate the object while it is lifted. Further, the two users may operate on the same dimension of a virtual object. One user may impart lateral force on a virtual ball to roll it. The second user may impart a second lateral force in the same direction as the first user, and this additional force applied to the virtual ball will cause it to roll with an increased velocity.

Conclusion

While the present disclosure has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for manipulating a first virtual object in a virtual space, the first virtual object being associated with a physical object in a first physical space, the physical object being separate from a first user, comprising:
   receiving first depth image data indicative of the first physical space;
   generating the first virtual object in the virtual space based on the physical object as represented in the first depth image data;
   in response to receiving second depth image data indicative of the first physical space where the physical object is being moved by the first user, displaying a corresponding moving of the first virtual object in the virtual space; and
   in response to receiving third depth image data indicative of a second user in a second physical space, the second physical space differing from the first physical space in which the physical object is located, and in response to determining that the third depth image data is indicative of the second user attempting to move a second virtual object in the virtual space and the first virtual object in the virtual space without the second user having moved the physical object in the first physical space, determining to display movement of the second virtual object and not to display movement of the first virtual object.

2. The method of claim 1, wherein the virtual space comprises a representation of the first physical space, a virtual sub-space, a representation of the second physical space, or a combination thereof.

3. The method of claim 1, wherein there is a scale of movement, and wherein displaying a corresponding moving of the first virtual object comprises:
   displaying the corresponding moving of the first virtual object based on an amount that the physical object is moved modified by the scale of movement.

4. The method of claim 1, wherein the virtual space is presented to the first user in a first-person perspective or a third-person perspective.

5. A system for interacting with a first virtual object in a virtual environment, the first virtual object being associated with a physical object in a first physical space, the physical object being separate from a first user, comprising:
   a memory bearing instructions that, upon execution by a processor, cause the system at least to:
      generate the first virtual object based in the virtual environment on the physical object as represented in first depth image data;
      in response to receiving second depth image data indicative of the first physical space where the physical object is being moved by the first user, display a corresponding moving of the first virtual object in the virtual environment; and
      in response to receiving third depth image data indicative of a second user in a second physical space, the second physical space differing from the first physical space in which the physical object is located, and in response to determining that the third depth image data is indicative of the second user attempting to move a second virtual object in the virtual environment and the first virtual object in the virtual environment without the second user having moved the physical object in the first physical space, determine to display movement of the second virtual object and not to display movement of the first virtual object.

6. A computer-readable storage device that is not a propagating signal comprising computer-readable instructions that upon execution on a computer, cause the computer to perform operations comprising:
   receiving first depth image data indicative of a first physical space;
   generating a first virtual object in a virtual space based on a physical object as represented in the first depth image data;
   in response to receiving second depth image data indicative of the first physical space where the physical object is being moved by a first user, displaying a corresponding moving of the first virtual object in the virtual space; and
   in response to receiving third depth image data indicative of a second user in a second physical space, the second physical space differing from the first physical space in which the physical object is located, and in response to determining that the third depth image data is indicative of the second user attempting to move a second virtual object in the virtual space and the first virtual object in the virtual space without the second user having moved the physical object in the first physical space, determining to display movement of the second virtual object and not to display movement of the first virtual object.

7. The system of claim 5, wherein the virtual environment comprises a representation of the first physical space, a virtual sub-space, a representation of the second physical space, or a combination thereof.

8. The system of claim 5, wherein there is a scale of movement, and wherein the instructions that, upon execution by the processor, cause the system to at least display a corresponding moving of the first virtual object further cause the system at least to:
   display the corresponding moving of the first virtual object based on an amount that the physical object is moved modified by the scale of movement.

9. The system of claim 5, wherein the virtual environment is presented to the first user in a first-person perspective or a third-person perspective.

10. The computer-readable storage device of claim 6, wherein the virtual space comprises a representation of the first physical space, a virtual sub-space, a representation of the second physical space, or a combination thereof.

11. The computer-readable storage device of claim 6, wherein there is a scale of movement, and wherein displaying a corresponding moving of the first virtual object comprises:
   displaying the corresponding moving of the first virtual object based on an amount that the physical object is moved modified by the scale of movement.

12. The computer-readable storage device of claim 6, wherein the virtual space is presented to the first user in a first-person perspective or a third-person perspective.

13. The method of claim 1, further comprising:
   in response to receiving fourth depth image data indicative of the physical object being moved in the first physical space by the first user, determining not to display a corresponding moving of the first virtual object where the moving of the first virtual object conflicts with a boundary of the virtual space.

14. The system of claim 5, further comprising instructions that upon execution cause the system to perform further operations, comprising:
   in response to receiving fourth depth image data indicative of the physical object being moved in the first physical space by the first user, determine not to display a corresponding moving of the first virtual object where the moving of the first virtual object conflicts with a boundary of the virtual environment.

15. The computer-readable storage device of claim 6, further comprising instructions that upon execution cause the system to perform further operations, comprising:
   in response to receiving fourth depth image data indicative of the physical object being moved in the first physical space by the first user, determining not to display a corresponding moving of the first virtual object where the moving of the first virtual object conflicts with a boundary of the virtual space.

* * * * *